(No Model.)
C. R. SCHMIDT.
JOINT OR COUPLING FOR PIPES AND PIPE FITTINGS.
No. 485,116. Patented Oct. 25, 1892.
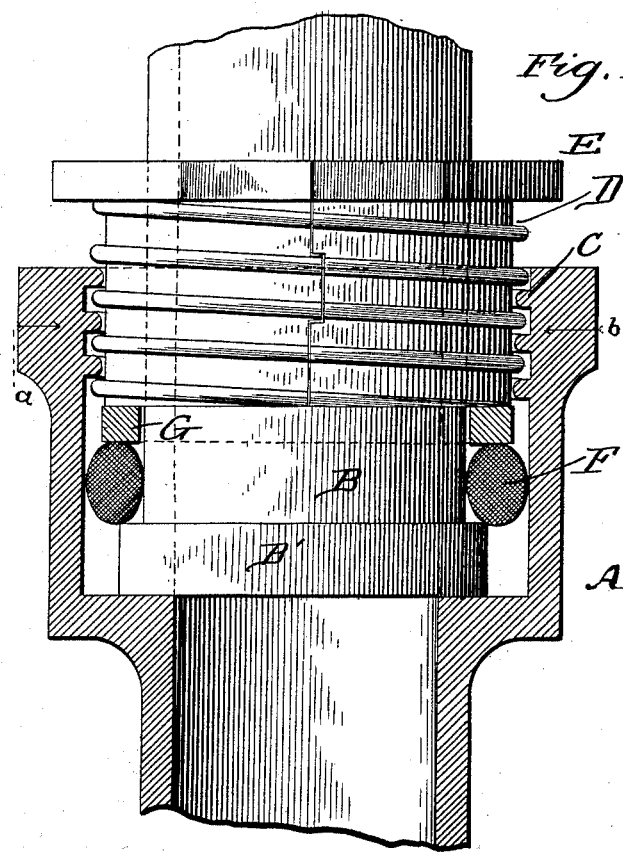
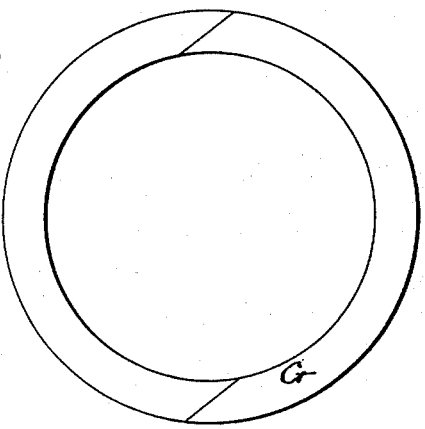
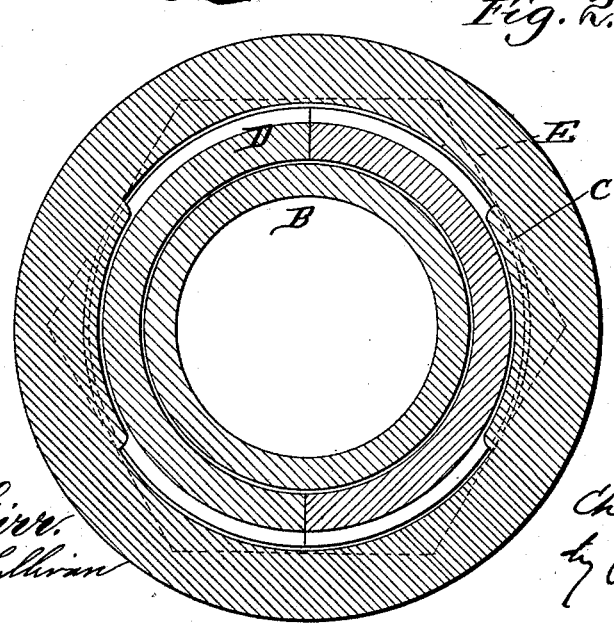
Witnesses:
J. B. McGirr.
Joseph Sullivan
Inventor.
Chas. R. Schmidt
by Connolly Bros
attys

UNITED STATES PATENT OFFICE.

CHARLES R. SCHMIDT, OF BALTIMORE, MARYLAND, ASSIGNOR TO THE HENRY McSHANE MANUFACTURING COMPANY OF BALTIMORE, OF SAME PLACE.

JOINT OR COUPLING FOR PIPES AND PIPE-FITTINGS.

SPECIFICATION forming part of Letters Patent No. 485,116, dated October 25, 1892.

Application filed July 9, 1892. Serial No. 439,497. (No model.)

*To all whom it may concern:*

Be it known that I, CHARLES R. SCHMIDT, a citizen of the United States, residing at Baltimore, in the State of Maryland, have invented certain new and useful Improvements in Joints or Couplings for Pipes and Pipe-Fittings; and I do hereby declare the following to be a full, clear, and exact description of the invention, such as will enable others skilled in the art to which it appertains to make and use the same.

My invention has relation to pipe joints or couplings, and especially to joints or couplings for cast-iron soil and drain pipes and fittings and greenhouse-heating pipes of the bowl or hub and spigot or bead end type.

The object of my invention is to provide a joint or coupling by which the bowl and spigot ends of cast-iron pipe may be conveniently, speedily, and securely fastened together, so as to produce a fluid-tight joint which will not become disarranged or caused to leak under the side strain or lateral pressure due to the settling of buildings or the sagging of the pipe-supports.

The present mode of joining cast-iron pipes and fittings is usually to insert the bead or spigot end of one section into the bowl or hub end of the other section and make a calked lead joint. Should the building or structure in which the pipe so connected and lead calked are situated settle somewhat, as is almost invariably the case, the side strain brought upon the joints by the settling will bend the pipe at the joints and cause the lead packing to be compressed on one side of the joint and opened on the other, thus producing leaks where before a tight joint existed. In some cases the strain is so great as to break the pipe unless there is some portion of the joint capable of yielding.

My invention contemplates the provision of certain novel features whereby the sagging or bending of the pipe at the joints is permitted without danger of leakage or injury to the coupling.

My invention consists in the novel construction, combination, and arrangement of parts hereinafter described and claimed.

In the accompanying drawings, Figure 1 is a central longitudinal sectional view of my improved pipe joint or coupling. Fig. 2 is a transverse sectional view on the line $a\ b$ of Fig. 1. Fig. 3 is a face view of the split ring forming part of the coupling.

A designates the bowl end of a cast-iron pipe, and B the spigot or bead end of another section of pipe inserted in the bowl end of the first-named section. The sections of pipe are of the usual structure, except that the bowl for the purposes of my invention is cast with a number of discontinuous screw-threads C on the inside and at the mouth of the bowl. These screw-threads are employed for the purpose of receiving and holding a threaded split thimble or hollow nut D and are made discontinuous for convenience of manufacture, it being much easier and safer to form partial threads in the molds than to produce continuous ones. The hollow threaded split thimble or nut D is made in two sections, so that it may be applied to the spigot end of a beaded pipe, so as to embrace the same closely. One of the sections of the thimble or nut D is formed with a rectangular recess on each of its abutting edges, and the other section is formed with a tenon on each edge which enters the recess on the other section, so as to preserve the proper relative positions of the two sections. This thimble or nut is formed with a wide flange E, which may be either octagonal for the purpose of receiving a wrench with which to adjust the nut, or round, with suitable holes in the side to receive a pin or lever, by means of which the thimble or nut may be turned.

F designates a rubber ring or gasket made of oval or rounded form in cross-section and adapted to encircle the section B immediately above or back of the bead B′, and G is a split metallic ring of rectangular form in cross-section, which is applied to the section B back of the gasket F and between it and the inner end of the threaded thimble or nut D. The ring G embraces the section B closely and is for this reason made in two sections, so as to pass over the bead.

In coupling pipes according to my invention the rubber gasket F is first slipped over the bead of section B and this section then inserted in the bowl of section A. The metallic ring G is then applied to the section B back of the gasket, and the threaded thimble or nut D next adjusted upon the pipe B and screwed into the bowl of section A until it contacts with the ring G and presses the same strongly against the gasket F, causing the latter to spread against the surfaces with which it is in contact, thereby producing a tight but elastic joint. The joint may be further tightened up at pleasure to compensate for any contraction of the gasket, or the pipe-sections may be entirely disconnected without injury to the component parts of the coupling.

It is not necessary for the purposes of my invention to change the existing patterns of cast-iron pipes and fittings, as the threads on the interior of the bowl are provided for by making suitable impressions in the mold after the patterns have been withdrawn.

Porcelain-lined or enameled pipe and fittings can be used without cracking or chipping the enamel.

Having described my invention, I claim—

1. In a pipe-coupling, the combination of a section having an interiorly-screw-threaded integral bowl and a section having a beaded spigot end with an elastic gasket fitted on the spigot end behind the bead, a split ring surrounding the spigot end adjacent to the gasket, and an exteriorly-screw-threaded split thimble or nut screwing into the bowl and abutting against the said split ring, substantially as described.

2. In couplings for cast-iron pipes, the combination, with the beaded spigot end B, gasket F, and threaded split thimble or hollow nut D, of the bowl end or section A, formed with mutilated or discontinuous threads on its inner surface for the engagement of the threaded thimble, substantially as described.

In testimony whereof I affix my signature in presence of two witnesses.

CHARLES R. SCHMIDT.

Witnesses:
JULIAN J. G. McSHANE,
JNO. T. MADDOX.